(12) United States Patent
Shah et al.

(10) Patent No.: US 9,483,647 B2
(45) Date of Patent: Nov. 1, 2016

(54) FIRMWARE VERIFIED BOOT

(71) Applicant: GOOGLE INC., Mountain View, CA (US)

(72) Inventors: Gaurav Shah, Mountain View, CA (US); William Drewry, Nashville, TN (US); Randall Spangler, San Jose, CA (US); Ryan Tabone, San Francisco, CA (US); Sumit Gwalani, Sunnyvale, CA (US); Luigi Semenzato, Oakland, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/330,902

(22) Filed: Jul. 14, 2014

(65) Prior Publication Data

US 2015/0012738 A1 Jan. 8, 2015

Related U.S. Application Data

(63) Continuation of application No. 12/903,202, filed on Oct. 12, 2010, now Pat. No. 8,812,854.

(60) Provisional application No. 61/251,293, filed on Oct. 13, 2009.

(51) Int. Cl.
G06F 21/55 (2013.01)
G06F 21/57 (2013.01)
(Continued)

(52) U.S. Cl.
CPC ............ *G06F 21/575* (2013.01); *G06F 21/554* (2013.01); *G06F 21/74* (2013.01); *H04L 9/3247* (2013.01)

(58) Field of Classification Search
USPC ........................................................ 713/176
See application file for complete search history.

(56) References Cited

U.S. PATENT DOCUMENTS 6,185,678 B1 2/2001 Arbaugh et al.
6,263,445 B1 * 7/2001 Blumenau ............... G06F 21/31
380/282

(Continued)

FOREIGN PATENT DOCUMENTS

WO 2011/047078 A2 4/2011
WO 2011/047078 A3 6/2011

OTHER PUBLICATIONS

Fujitsu, Recovery BIOS and BIOS Update, May 2009, ftp://ftp.ts.fujitsu.com/pub/mainboard-oem-sales/Information/ProductFacts/PF_Recovery_BIOS_e.pdf.*

(Continued)

*Primary Examiner* — Andrew Nalven
*Assistant Examiner* — Khang Do
(74) *Attorney, Agent, or Firm* — Brake Hughes Bellermann LLP

(57) ABSTRACT

Methods and apparatus for verifying a boot process of a computing system are disclosed. An example computer-implemented method includes reading, by a computing system during a boot process, a header section of a read-write portion of firmware of the computing system. The example method further includes generating, using a first cryptographic hash algorithm, a message digest corresponding with the header. The example method also includes decrypting, using a first public-key, an encrypted signature corresponding with the header. The example method still further includes comparing the message digest corresponding with the header and the decrypted signature corresponding with the header. In the event the message digest corresponding with the header and the decrypted signature corresponding with the header match, the example method includes continuing the boot process. In the event the message digest corresponding with the header and the decrypted signature corresponding with the header do not match, the example method includes halting the boot process.

19 Claims, 13 Drawing Sheets

(51) Int. Cl.
*G06F 21/74* (2013.01)
*H04L 9/32* (2006.01)

(56) References Cited

U.S. PATENT DOCUMENTS

| | | | |
|---|---|---|---|
| 6,324,650 B1* | 11/2001 | Ogilvie | G06F 21/6209 726/2 |
| 6,622,246 B1* | 9/2003 | Biondi | G06F 9/4401 713/100 |
| 7,213,155 B2 | 5/2007 | Sako et al | |
| 7,808,982 B2* | 10/2010 | Reilly | H04L 45/00 370/357 |
| 8,396,100 B2 | 3/2013 | Corts et al. | |
| 8,812,854 B2 | 8/2014 | Shah et al. | |
| 2003/0041239 A1 | 2/2003 | Shear et al. | |
| 2003/0217193 A1* | 11/2003 | Thurston | G06F 8/65 719/321 |
| 2004/0030768 A1* | 2/2004 | Krishnamoorthy | H04L 29/06 709/223 |
| 2004/0030877 A1 | 2/2004 | Frid | |
| 2004/0122863 A1* | 6/2004 | Sidman | H04L 12/2697 |
| 2005/0125681 A1* | 6/2005 | Bressy | G06F 21/71 713/189 |
| 2005/0251673 A1* | 11/2005 | Bosley | G06F 11/1433 713/2 |
| 2007/0192580 A1 | 8/2007 | Challener et al. | |
| 2008/0141017 A1* | 6/2008 | McCoull | G06F 21/575 713/2 |
| 2008/0276059 A1 | 11/2008 | Horiuchi et al. | |
| 2009/0016527 A1 | 1/2009 | Vigarie et al. | |
| 2011/0087872 A1 | 4/2011 | Shah et al. | |

OTHER PUBLICATIONS

Non-Final Office Action for U.S. Appl. No. 12/903,202, mailed on May 23, 2013, 31 pages.
Final Office Action for U.S. Appl. No. 12/903,202, mailed on Oct. 21, 2013, 31 pages.
Notice of Allowance for U.S. Appl. No. 12/903,202, mailed on Apr. 14, 2014, 7 pages.
International Search Report and Written Opinion received for PCT Patent Application No. PCT/US2010/052542, mailed on Apr. 29, 2011, 16 pages.
Yee, Bennet, "Using Secure Coprocessors", School of Computer Science, CMU-CS-94-149, May 1994, pp. 1-94.
Arbaugh et al., "Automated Recovery in a Secure Bootstrap Process", Distributed system Laboratory, Philadelphia, PA, Nov. 21, 1997, 16 pages.
chromium.org, "Firmware Boot and Recovery", The Chromium Projects, Nov. 19, 2009, 14 pages.

* cited by examiner

FIRMWARE VERIFIED BOOT

CROSS REFERENCE TO RELATED APPLICATIONS

This application is a Continuation of, and claims priority to, U.S. patent application Ser. No. 12/903,202, filed on Oct. 12, 2010, entitled "FIRMWARE VERIFIED BOOT", which, in turn, claims the benefit under 35 U.S.C. §119(e) of U.S. Provisional Patent Application Ser. No. 61/251,293, filed on Oct. 13, 2009, entitled "GOOGLE CHROME OS", the disclosures of which are incorporated by reference herein in their entirety.

TECHNICAL FIELD

This application relates in general, to computer security. More specifically, this application relates to a methods and apparatus for verified boot of a computing system.

BACKGROUND

Use of personal computing devices such as personal computers, laptop computers and netbook computers, among other devices continues to grow. Such systems are used for entertainment, business, maintaining financial records, among numerous other purposes. Such systems are also targets for attacks by malicious actors. For instance, such attacks may include placing malicious software on a computing system. Such malicious software (malware) may compromise the security of the computing system by collecting personal information from the computing system, such as from memory or by using programs such as keyloggers, to collect passwords and other information entered into the computing system, as some examples. In other instances, the malware may be a computer virus or other malicious code.

Such attacks can be accomplished in a number of ways. For example, a malicious actor may gain access to a user's system in a public setting, such as at a conference, or a coffee shop. In other situations, a malicious actor may deliver malware over a network connection, such as via a website, for example.

One way to accomplish such malicious acts is to modify a "boot path" of a computing system to include malware in the boot path or to place the computing system in a vulnerable state where it can be accessed or attached remotely. In such a situation, a malicious actor may corrupt or replace instructions that are used to boot, or startup, a computing system with malicious instructions. For instance, instructions in firmware of a computing system may be modified and/or replaced with malware.

In many computer architectures, firmware is the lowest level of software that is executed on a computing system. The firmware may include instructions that initialize a main processor, random access memory and chipsets, among other system components. Typically, the firmware is read-write and can be modified in the field, such as to allow for updates that may correct defects or address security vulnerabilities. However, because such firmware is writeable, it can be modified, which makes associated computing systems subject to attack.

In such a system, the system may "boot" or startup by first executing instructions of the firmware and then executing instructions of an operating system kernel (which may be stored on a hard-disk or other mass storage device, such as a flash disk). This sequence of instructions may be referred to as a "boot path" for the system. Malicious acts may be accomplished, for example, by corrupting/modifying one or more portions of the boot path.

For a given system, updates may be made to elements of the boot path (e.g., firmware and/or operating system kernel). Such updates may be made to address known security concerns with previous versions. This, however, provides another way to accomplish malicious acts, such as by reverting elements of the boot path of a system to a previous version, where that previous version has a known security issue that can be readily exploited by the malicious actor.

SUMMARY

In a first general aspect, a computer-implemented method includes reading, by a computing system during a boot process, a header section of a read-write portion of firmware of the computing system. The method of the first general aspect further includes generating, using a first cryptographic hash algorithm, a message digest corresponding with the header and decrypting, using a first public-key, an encrypted signature corresponding with the header. The method of the first general aspect also includes comparing the message digest corresponding with the header and the decrypted signature corresponding with the header. In the event the message digest corresponding with the header and the decrypted signature corresponding with the header match, the method of the first general aspect includes continuing the boot process. In the event the message digest corresponding with the header and the decrypted signature corresponding with the header do not match, the method of the first general aspect includes halting the boot process.

In a second general aspect, a computer-implemented boot process for a computing system includes verifying, by a processor of the computing system, an encrypted signature corresponding with a first portion of a read-write portion of firmware of the computing system using a first public-key and a first cryptographic hash algorithm. In the boot process of the second general aspect, the computing system halts the boot process if the verification of the encrypted signature corresponding with the first portion of the read only firmware fails. The boot process of the second general aspect further includes verifying, by the processor, an encrypted signature corresponding with a second portion of the read-write portion of the firmware using a second public-key and a second cryptographic hash algorithm. In the boot process of the second general aspect, the computing system halts the boot process if the verification of the encrypted signature corresponding with the second portion of the read-write firmware fails. The boot process of the second general aspect also includes verifying, by the processor, an encrypted signature corresponding with a third portion of the read-write portion of the firmware using the second public-key and the second cryptographic hash algorithm. In the boot process of the second general aspect, the computing system halts the boot process if the verification of the encrypted signature corresponding with the third portion of the read-write firmware fails. The boot process of the second general aspect further includes verifying, by the processor, an encrypted signature corresponding with a first portion of an operating-system kernel using the second public-key and the second cryptographic hash algorithm. In the boot process of the second general aspect, the computing system halts the boot process if the verification of the encrypted signature corresponding with the first portion of the operating-system kernel fails. The boot process of the second general aspect yet further includes verifying, by the processor, an encrypted signature corresponding with a second portion of an operating-system kernel using a third public-key and a third cryptographic hash algorithm. In the boot process of the second general aspect, the computing system halts the boot process if the verification of the encrypted signature corresponding with the second portion of the operating-system kernel fails.

In a third general aspect, a computing system includes one or more machine readable storage media having instructions stored thereon. In the computing system of the third general aspect, the instructions, when executed by a processor of the computing system, cause the computing system to read, during a boot process, a header section of a read-write portion of firmware of the computing system and generate, using a first cryptographic hash algorithm, a message digest corresponding with the header. The instructions of the computing system of the third general aspect, when executed by the processor, also cause the computing system to decrypt, using a first public-key, an encrypted signature corresponding with the header and compare the message digest corresponding with the header and the decrypted signature corresponding with the header. In the event the message digest corresponding with the header and the decrypted signature corresponding with the header match, the instructions of the computing system of the third general aspect, when executed by the processor, cause the computing system to continue the boot process. In the event the message digest corresponding with the header and the decrypted signature corresponding with the header do not match, the instructions of the computing system of the third general aspect, when executed by the processor, cause the computing system to halt the boot process.

In a fourth general aspect, a computing system includes one or more machine readable storage media having instructions stored thereon, the instructions, when executed by a processor of the computing system, cause the computing system to verify an encrypted signature corresponding with a first portion of a read-write portion of firmware of the computing system using a first public-key and a first cryptographic hash algorithm, where the instructions cause the computing system to halt the boot process if the verification of the encrypted signature corresponding with the first portion of the read only firmware fails. The instructions of the computing system of the fourth general aspect, when executed by the processor, also cause the computing system to verify an encrypted signature corresponding with a second portion of the read-write portion of the firmware using a second public-key and a second cryptographic hash algorithm, where the instructions cause the computing system to halt the boot process if the verification of the encrypted signature corresponding with the second portion of the read-write firmware fails. The instructions of the computing system of the fourth general aspect, when executed by the processor, further cause the computing system to verify an encrypted signature corresponding with a third portion of the read-write portion of the firmware using the second public-key and the second cryptographic hash algorithm, where the instructions cause the computing system to halt the boot process if the verification of the encrypted signature corresponding with the third portion of the read-write firmware fails. The instructions of the computing system of the fourth general aspect, when executed by the processor, also further cause the computing system to verify an encrypted signature corresponding with a first portion of an operating-system kernel using the second public-key and the second cryptographic hash algorithm, where the instructions cause the computing system to halt the boot process if the verification of the encrypted signature corresponding with the first portion of the operating-system kernel fails. The instructions of the computing system of the fourth general aspect, when executed by the processor, still further cause the computing system to verify an encrypted signature corresponding with a second portion of an operating-system kernel using a third public-key and a third cryptographic hash algorithm, where the instructions cause the computing system to halt the boot process if the verification of the encrypted signature corresponding with the second portion of the operating-system kernel fails.

In a fifth general aspect, a computer-implemented boot process for a computing system includes verifying, by a processor of the computing system, an encrypted signature corresponding with a first portion of a read-write portion of firmware of the computing system using a first public-key and a first cryptographic hash algorithm, where the computing system halts the boot process if the verification of the encrypted signature corresponding with the first portion of the read only firmware fails. The boot process of the fifth general aspect also includes verifying, by the processor, an encrypted signature corresponding with a second portion of the read-write portion of the firmware using a second public-key and a second cryptographic hash algorithm, where the computing system halts the boot process if the verification of the encrypted signature corresponding with the second portion of the read-write firmware fails. The boot process of the fifth general aspect further includes verifying, by the processor, an encrypted signature corresponding with a first portion of an operating-system kernel using the second public-key and the second cryptographic hash algorithm, where the computing system halts the boot process if the verification of the encrypted signature corresponding with the first portion of the operating-system kernel fails. The boot process of the fifth general aspect also further includes verifying, by the processor, an encrypted signature corresponding with a second portion of an operating-system kernel using a third public-key and a third cryptographic hash algorithm, where the computing system halts the boot process if the verification of the encrypted signature corresponding with the second portion of the operating-system kernel fails.

In a sixth general aspect, a computer-implemented boot process for a computing system includes verifying, by a processor of the computing system, an encrypted signature corresponding with a first portion of a read-write portion of firmware of the computing system using a first public-key and a first cryptographic hash algorithm. If the verification of the encrypted signature corresponding with the first portion of the read-write portion of the firmware is successful, the boot process of the sixth general aspect includes verifying, by the processor, an encrypted signature corresponding with a second portion of the read-write portion of the firmware using a second public-key and a second cryptographic hash algorithm If the verification of the encrypted signature corresponding with the second portion of the read-write portion of the firmware is successful, the boot process of the sixth general aspect includes verifying, by the processor, an encrypted signature corresponding with a third portion of the read-write portion of the firmware using the second public-key and the second cryptographic hash algorithm. If the verification of the encrypted signature corresponding with the third portion of the read-write portion of the firmware is successful, the boot process of the sixth general aspect includes verifying, by the processor, an encrypted signature corresponding with a first portion of an operating-system kernel using the second public-key and the second cryptographic hash algorithm. If the verification of the encrypted signature corresponding with the first portion of an operating-system kernel is successful, the boot process of the sixth general aspect includes verifying, by the processor, an encrypted signature corresponding with a second portion of an operating-system kernel using a third public-key and a third cryptographic hash algorithm.

BRIEF DESCRIPTION OF THE DRAWINGS

Like reference symbols in the various drawings indicate like elements.

DETAILED DESCRIPTION

Figure 1:
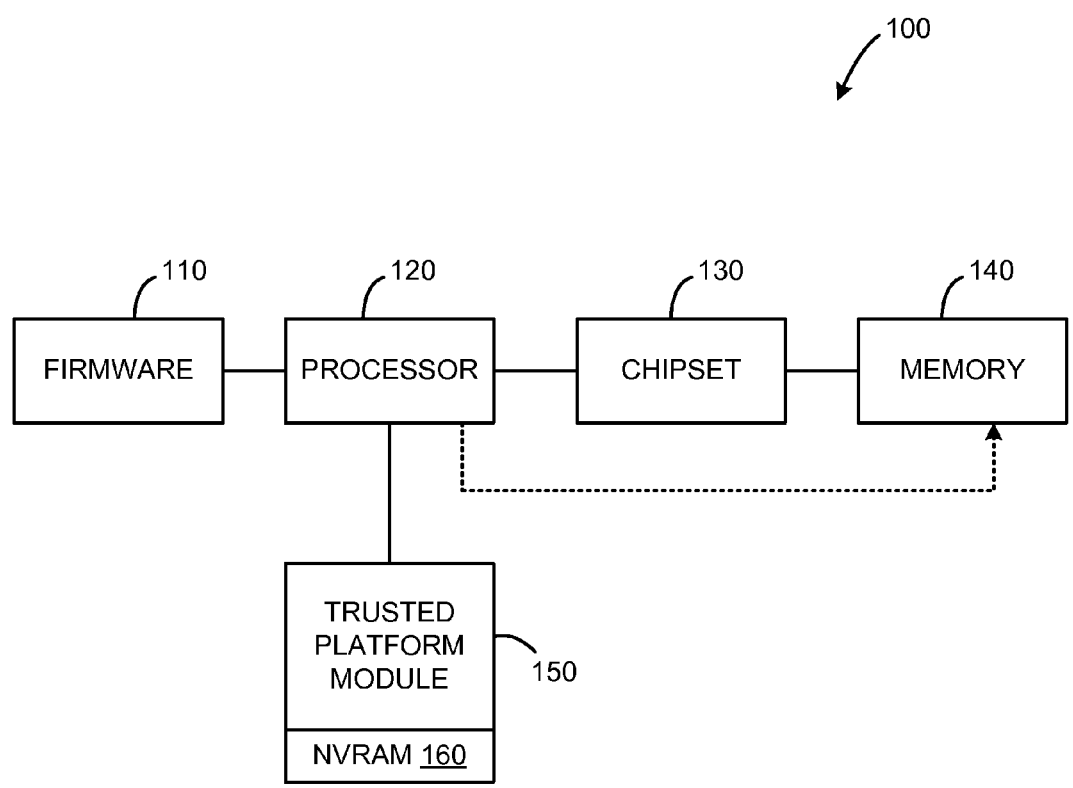
FIG. 1 is a block diagram illustrating a system which may implement a verified boot path in accordance with an example embodiment.

FIG. 1 is a block diagram illustrating a computing system 100 which may be used to implement a verified boot path or verified boot process in accordance with an example embodiment, such as using the techniques described herein. It is noted that the operations of a verified boot process using the techniques described herein may be performed in a number of orders and the sequences here are given by way of example. Also, a verified boot process may include some of the techniques described herein, while excluding others.

The system 100 includes firmware 110. The firmware 110 may include instructions for implementing a verified boot process, such as cryptographic algorithms, one or more cryptographic keys and boot instructions for implementing the verified boot path and initializing the computing system 100. The instructions in the firmware 110 may be executed by the processor 120 to implement the verified boot process. The processor 120 may be a main application processor of the system 100. Alternatively, the processor 120 may be a special purpose processor that is used by the system to execute the instructions stored in the firmware 110 to initialize the system and verify the boot path is secure. It is noted that the exact approach used to execute instructions stored in the firmware 110 depends on the particular embodiment. In still other embodiments, firmware may be provided to a computing system from a remote, or network location, such as using, for example, a Preboot Execution Environment (PXE). In such approaches, signed images (e.g., including a R/W firmware portion, a kernel and/or an operating system) may be provided to a computing system from a network location.

The system 100 also includes a chipset 130. The chipset 130 may be initialized during a verified boot process. The chipset 130 may include one or more devices that control the various components of the computing system 100 (some of which are not shown in FIG. 1). For instance, the chipset may include a display controller, a Universal Serial Bus controller and a memory controller, among a number of other elements. The exact configuration of the chipset 130 would depend on the particular embodiment.

The system 100 also includes memory 140, which may include non-volatile memory (e.g., hard disk or solid state disk) and random access memory (RAM). As shown in FIG. 1, the memory 140 may interface with the processor 120 directly or via the chipset 130 (e.g., via a memory controller). The system 100 also includes a trusted platform module (TPM) 150. The TPM 150 includes non-volatile RAM (NVRAM) locations 160. The TPM 150 may implement a number of mechanisms for locking the NVRAM locations 160, either individually or globally. In an example embodiment, the NVRAM locations 160 may be used by the system 100 to securely store information related to a verified boot process, where locking of the NVRAM 160 is controlled by instructions in both the read-only portion and read-write portions of the firmware 110. For instance, firmware version numbers and encryption key version numbers may be stored in respective NVRAM locations 160, where these version numbers are used to ensure that there has not been an attempt to "roll back" a system to a previous firmware version or encryption key version, such as to versions with known security vulnerabilities.

Figure 2:
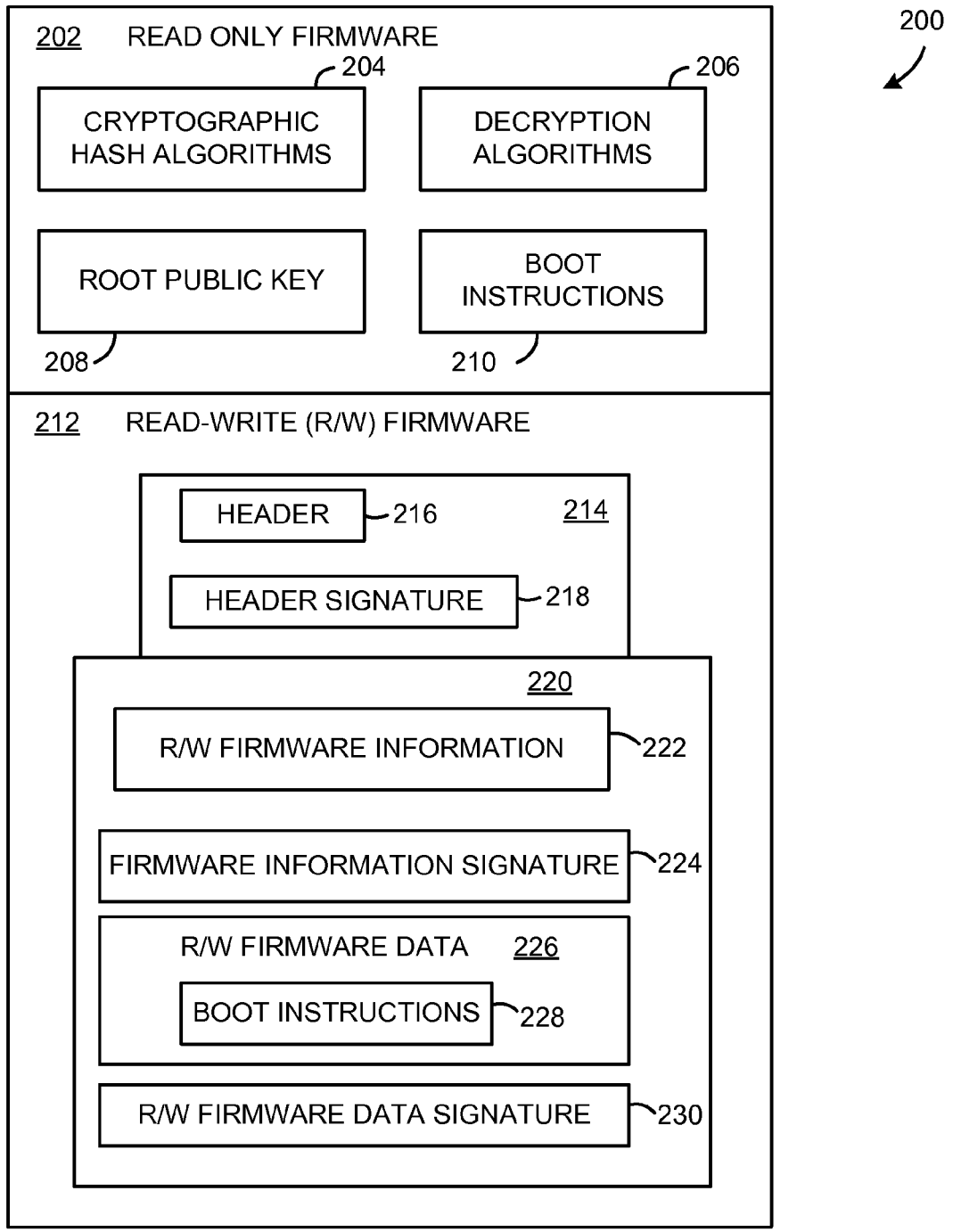
FIG. 2 is a block diagram illustrating a firmware component in accordance with an example embodiment.

FIG. 2 is a block diagram illustrating a firmware component 200 in accordance with an example embodiment. The firmware component 200 may be implemented, for example, in the system 100 as firmware 110. Of course, the firmware 200 could also be implemented in other systems and system configurations.

As shown in FIG. 2, the firmware 200 includes a read-only (R/O) portion 202 and a read-write (R/W) portion 212. The R/O portion 202 of the firmware 200 may include a number of items. For instance, the R/O portion 202 may include instructions for one or more cryptographic hash algorithms 204. These cryptographic hash algorithms 204 may be used, such as in the fashions described herein, to implement a verified boot process for a computing system.

The cryptographic hash algorithms 204 may take a number of forms. However, in an example embodiment, the cryptographic hash algorithms 204 may include Secure Hash Algorithm 1 (SHA-1), SHA-256 and SHA-512. As is known, these algorithms may be used to generate cryptographic hashes of various "strengths," where SHA-1 is the "weakest" of the three algorithms, and SHA-512 is the "strongest" of the three algorithms In this context, strength and weakness refer to the computational complexity of the algorithm.

While the more computationally complex algorithms are more secure, they also have a greater impact on system performance, and for a verified boot process, may affect the amount of time a system takes to complete its boot process. Accordingly, depending on the particular embodiment, the strength of the algorithm used may take into consideration the corresponding impact on performance. The SHA algorithms are given by way of example and other cryptographic hash algorithms may be included in the firmware 200 to implement a verified boot process.

The R/O portion 202 of the firmware 200 also includes instructions for one or more decryption algorithms 206. As with the cryptographic hash algorithms 204, the decryption algorithms 206 may be used, such as in the fashions described herein, to implement a verified boot process for a computing system.

The decryption algorithms 206 may take a number of forms. In an example embodiment, the decryption algorithms 206 may include one or more public-key decryption algorithms, such as, for example, RSA-1024, RSA-2048 and RSA-4096. As is known, and in similar fashion as the cryptographic hash algorithms 204, the RSA algorithms may be used to encrypt/decrypt data to generate encrypted signatures and decrypt those encrypted signatures using key pairs. In such an approach, a signature may be encrypted using a private-key, which is kept secret by the person or entity that is generating the signature. The encrypted signature may then be decrypted using a public-key that corresponds with the private-key used to generate the signature. If the key used for decryption is the corresponding key of a pair (either a private-key corresponding with a public-key used for encryption, or a public-key corresponding with a private-key used for encryption), the decryption process will produce the same data that was encrypted. If the key used for decryption is not the corresponding key of a pair, the decryption process will not produce the same data that was encrypted.

As with the cryptographic hash algorithms 204, strength and weakness of the decryption algorithms 206 refers to the computational complexity of the specific algorithm, where strength is directly proportional to the key-size. For the RSA algorithms, the key-size (which is indicated in the algorithm designation) is the number of bits of data that each key of a key pair includes. In like fashion as the cryptographic hash algorithms 204, while the more computationally complex RSA algorithms are more secure, they also have a greater impact on system performance. In the foregoing, the RSA algorithms are described by way of example and other encryption/decryption algorithms may be used to implement a verified boot process, such as the verified boot processes described herein.

As shown in FIG. 2, the R/O portion of the firmware 200 also includes a root public-key 208. As described in more detail below, the root public key 208 may be used to decrypt an encrypted signature of a first portion of the R/W write portion 212 of the firmware 200. For example, the root public-key 208 may be used to decrypt a signature corresponding with a header of the R/W firmware portion 212, where the encrypted signature is generated by a system manufacturer using a private-key that corresponds with the root public-key 208. It is noted, that since the root public key 208 is included in the R/O portion of the firmware 200, it can only be changed by replacing the firmware 200 with a new firmware component that includes a new root public-key 208. As the cost associated with such a replacement is extremely high, it may be desirable to use a public-key pair of the highest strength available in order to reduce the likelihood that the private-key could be compromised, for instance, RSA-8192. Furthermore, proper security measures should be taken to prevent the private-key half of the key pair from being divulged to unauthorized persons.

As is also shown in FIG. 2, the R/O firmware portion 202 also includes boot instructions 210. The boot instructions 210 may include instructions for initializing a computing system in which the firmware 200 is implemented. The boot instructions 210 may also include instructions for implementing a verified boot process, or be part of a secure/verified boot path. For example, the boot instructions 210 may include instructions for implementing at least some of the approaches described herein. In an example, embodiment, the boot instructions 210 must be successfully completed (e.g., encrypted signature verification must be successfully completed) before control of the boot process would be passed to the R/W firmware.

Using an approach such as illustrated in FIG. 2, the boot instructions 210 (in conjunction with the cryptographic hash algorithms 204, the decryption algorithms 206 and the root public key 208) may be used to read portions of the firmware, generate cryptographic hash values, decrypt encrypted signatures and compare cryptographic hash values (which may be referred to as message digests) with decrypted signatures to implement a verified boot process or secure boot path.

As with the R/O portion 202 of the firmware 200, the R/W portion 212 of the firmware 200 may also include a number of elements. As shown in FIG. 2, the R/W portion 212 includes a header section 214 and a R/W firmware data section 220. The header section 214, for the firmware 200, includes a header 216 (an example of which is discussed below with respect to FIG. 3) and a header signature 218. The header signature 218 may be generated by using one of the cryptographic hash algorithms 204 to generate a hash value from the header 216. Then an RSA algorithm (e.g., RSA-4096) may be used to encrypt that hash value using a (secret) private-key that corresponds with the root public-key 208 to produce the header signature 218. Such encrypted signature generation may be performed by a manufacturer of a system that includes the firmware 200, for example.

The header signature 218, e.g., during a verified boot, may be verified by generating a cryptographic hash value from the header 216 using the same cryptographic hash function that was used when generating the header signature 218. The specific cryptographic hash algorithm used may be indicated in the boot instructions 210, for example. The header signature 218 may then be decrypted using the root public-key 208, which should produce the same cryptographic hash value, as long as the proper keys are used and the firmware has not been corrupted and/or replaced. The decrypted header signature 218 may then be compared with the hash value generated from the header 216 as part of the verified boot process. If the values match, the header signature 218 is verified and the verified boot process may continue. If the values do not match, this may indicate that the system has been attacked. In this situation, the boot process may be halted.

In certain embodiments, failing a signature verification operation (e.g., verification of the header signature 218 or any other encrypted signature verification operation in the verified boot path, such as those discussed herein) may cause an associated computing system to enter a recovery mode in order to restore the system to a trusted state, e.g., by replacing the firmware and/or an operating system kernel of the system with a known trusted, most recent version. An example approach for implementing a recovery mode is discussed below. It will be appreciated, however, that such a recovery mode procedure may be implemented in a number of other fashions.

In an example embodiment, a recovery mode procedure may be implemented using machine-readable instructions that are included in firmware (e.g., read-only firmware) of a computing device and/or on a removable storage device that is operationally coupled with the computing device. In such an approach, a computing device may execute the recovery mode procedure when the computing device is operating in a secure, user mode. In such a secure, user mode the computing device may be configured to determine whether machine-readable instructions executed by the computing device are digitally signed by a trusted supplier of an operating system of the computing device, for example.

In an example approach, when a computing device enters recovery mode, the computing device may provide a user with instructions (e.g., using a display of the computing system) for obtaining an operating image for the computing device and storing that operating image on a removable storage device, such as, for example, a flash drive. Such an operating image may contain read-write firmware, an operating system kernel and/or an operating system for the computing device. In an example approach, the operating image may be obtained from, for example, a website that is maintained by a manufacturer of the computing device using a second computing device and then stored on the removable storage device.

Once the image is stored on the removable storage device, the removable storage device may be operationally coupled with the computing system that is executing the recovery procedure. The computing system may then locate the obtained image on the removable storage device. The computing device may then determine whether the image stored on the removable storage device is digitally signed by a trusted supplier. This determination may be made using, for example, corresponding public/private keys.

If the image stored on the removable storage device is digitally signed by the trusted supplier, the computing device may replace its current image (e.g., corrupted image) with the image stored on the removable storage device. If, however, the image stored on the removable storage device is not digitally signed by the trusted suppler, the computing device may display an indication that the image stored on the removable storage device is not a trusted image and the user may be provided with additional instructions to obtain a trusted operating image.

Also, in some embodiments, more than one copy of R/W firmware and/or a kernel may be included in a computing system. In such approaches, if the boot process fails a signature verification operation, the computing system may attempt to continue the boot process using the second copy of the firmware and/or kernel, as appropriate. If the computing system successfully boots using the second copy of the firmware and/or kernel, the first copy may be replaced with the contents of the second copy that resulted in the computing system successfully booting. If the boot process again fails a signature verification using the second copy of the firmware and/or kernel, the computing system may then enter a recovery mode, such as using the techniques described in Appendices A and B, for example.

As shown in FIG. 2, the R/W firmware data portion 220 also includes R/W firmware information 222 (an example of which is discussed below with respect to FIG. 4) and a corresponding firmware information signature 224. The R/W firmware data portion 220 also includes R/W firmware data 226, which includes boot instructions 228 that may be executed as part of a verified boot path, and a corresponding R/W firmware data signature 230. The firmware information signature 224 may be generated and verified in similar manners as described above with respect to the header signature 218. In certain embodiments, the firmware information signature 224 and the R/W firmware data signature 226 may be generated and verified using a cryptographic hash algorithm that is indicated in the header 216 and a public-key that is included in header 216, as well as a key size for that public-key that may also be indicated in the header 216. It will be appreciated that the arrangement of the firmware 200 is given by way of example and different arrangements are possible. Further, encrypted signatures may generated and verified in different manners, based any appropriate portion or section of the firmware 200.

Figure 3:
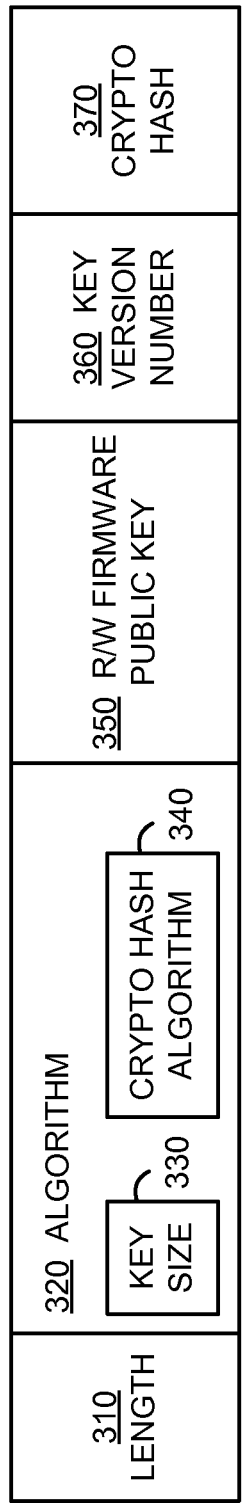
FIG. 3 is a diagram illustrating a read-write firmware header in accordance with an example embodiment.

FIG. 3 is a diagram illustrating a read-write firmware header 300 in accordance with an example embodiment that may be used to implement the header 216 in FIG. 2. Accordingly, for purposes of illustration, the header 300 will be described with further reference to FIG. 2. As shown in FIG. 3, the header 300 includes a length field 310. The length field 310 may store a value corresponding with a length of the header 300. The header 300 also includes an algorithm field 320. As shown in FIG. 3, the algorithm field may include a key-size field 330 and a cryptographic hash algorithm field 340.

In the embodiment illustrated in FIG. 2, the key-size field 330 may indicate a key-size that is to be used to verify encrypted signatures of the data portion 220 of the R/W firmware 212. In an embodiment that uses the RSA algorithms, the key-size field would indicate which RSA algorithm to use when performing encrypted signature verification for the data portion 220 of the R/W firmware 212. The cryptographic hash algorithm field 340 may indicate a cryptographic hash algorithm that is to be used when verifying encrypted signatures of the data portion 220 of the R/W firmware 212.

As shown in FIG. 3, the header 300 may also include a R/W firmware public key field 350 that may be used to store a public-key to use for decrypting signatures for the data portion 220 of the R/W firmware 212 during a verified boot process, such as the encrypted signatures 218, 224 and 230 discussed above with respect to the firmware 200. The header 300 may also include a key-version number field 360. The key-version number field 360 may be used to store a version number of the R/W firmware key stored in the R/W firmware public key field 350.

During a verified boot process, the key-version number stored in the field 360 may be compared to a highest-key-version number that is securely stored in a computing system, such as in a locked NVRAM location in a TPM, as was discussed above. Such an approach may be used to prevent use of a previous version of a R/W firmware public key, which may have been compromised and, therefore, could represent a security risk. Further, a manufacturer of a computing system may update the R/W firmware key on a periodic basis, in order to reduce the risk of a current key being compromised. Use of a securely stored highest-key-version number to verify that the R/W firmware public key in the header 300 is the most recent (or a newer version) prevents rollback to earlier key version and improves system security.

In certain embodiments, the header 300 may also include a crypto hash field 370. The crypto hash field 370 may include a cryptographic hash value that is generated from the other fields of the header 300. Including the crypto hash value in field 370 may provide additional security during the boot process or, in other embodiments, may provide a level of security for systems that do not employ the cryptography approaches discussed herein as part of a boot process.

Figure 4:
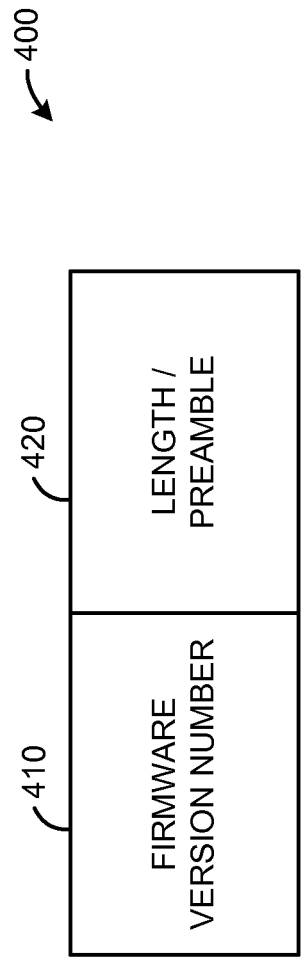
FIG. 4 is a diagram illustrating read-write firmware information in accordance with an example embodiment.

FIG. 4 is a diagram illustrating R/W firmware information 400 in accordance with an example embodiment. In an embodiment, the R/W firmware information 400 may be used to implement the R/W firmware information 222 in the firmware 200. The R/W firmware information 400 may include a firmware-version number 410 that indicates a version number of the firmware, such as the firmware 200. In like fashion as the key-version number discussed above, the firmware-version number 410 may be used, in conjunction with a securely stored highest-firmware-version number to prevent rollback to earlier firmware versions for the system, which may have known security vulnerabilities that an attacker may readily exploit.

The R/W firmware information 400 may also include a length/preamble field 420, where the length may indicate a length of associated R/W firmware data, such as the R/W firmware data 226. The preamble of the field 420 may include, for example, various metadata about the R/W firmware, such as, for example, a revision number, release date and/or other information.

Figure 5A:
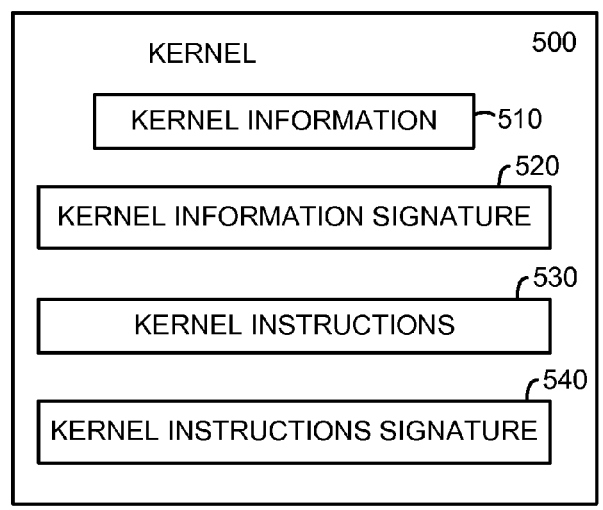
FIGS. 5A and 5B are diagrams illustrating an operating system kernel in accordance with an example embodiment.
Figure 5B:
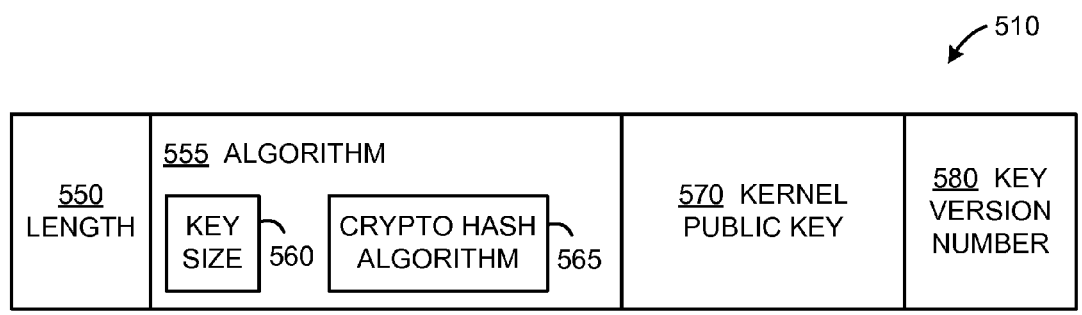

FIGS. 5A and 5B are diagrams illustrating an operating system kernel 500 in accordance with an example embodiment. The kernel 500 shown in FIG. 5 includes kernel information 510 and an associated kernel information signature 520. With reference to FIG. 2, in a verified boot process implemented using the firmware 200, the kernel information signature 520 may be verified using the public-key and cryptographic hash algorithm indicated in the header 216/300, for example. In such an approach, a R/W firmware public-key 350 may be used to verify the kernel information signature 520 in like fashion as using the root public key 208 to verify the header signature 218, as was discussed above. In this example, the kernel information signature 520 would be generated using the same cryptographic hashing algorithm indicated in field 340 and a private (secret) key corresponding with the R/W firmware public key stored in field 350. Of course, other verification approaches are possible and a different public key and/or cryptographic hashing algorithm could be used to verify the kernel information signature 520.

The kernel 500 also includes kernel instructions 530 and kernel instructions signature 540. The kernel instructions 530 may include instructions that are used to implement the basic functions of an operating system of a computing system and also may include instructions for implementing a verified boot process, such as using the techniques discussed herein. In an example embodiment, the kernel instructions signature 540 may be verified using a public-key and cryptographic hash algorithm that are indicated in the kernel information 510, in like fashion as the public-key and cryptographic hash algorithm included/indicated in the header 216/300 may be used to verify encrypted signatures included in the data portion 220 of the R/W firmware 212, as was discussed above.

FIG. 5B is a diagram that illustrates the kernel information 510 in accordance with an example embodiment. The kernel information 510 includes a substantially similar configuration as the header 300 discussed above with respect to FIG. 3. The kernel information 510 shown in FIG. 5B includes a length 550 (which may indicate a length of the kernel) and an algorithm field 555, which includes a key-size 560 and a cryptographic hash algorithm indicator 565, in similar fashion as the algorithm field 320 in the header 300. The kernel information 510 also includes a kernel public key 570 that may be used to verify the kernel instructions signature 540 and a key-version number 580 for the kernel public key 570. The key-version number 580 may be used in like fashion as the key-version number 360 discussed above to prevent rollbacks to earlier kernel public key versions.

Figure 6:
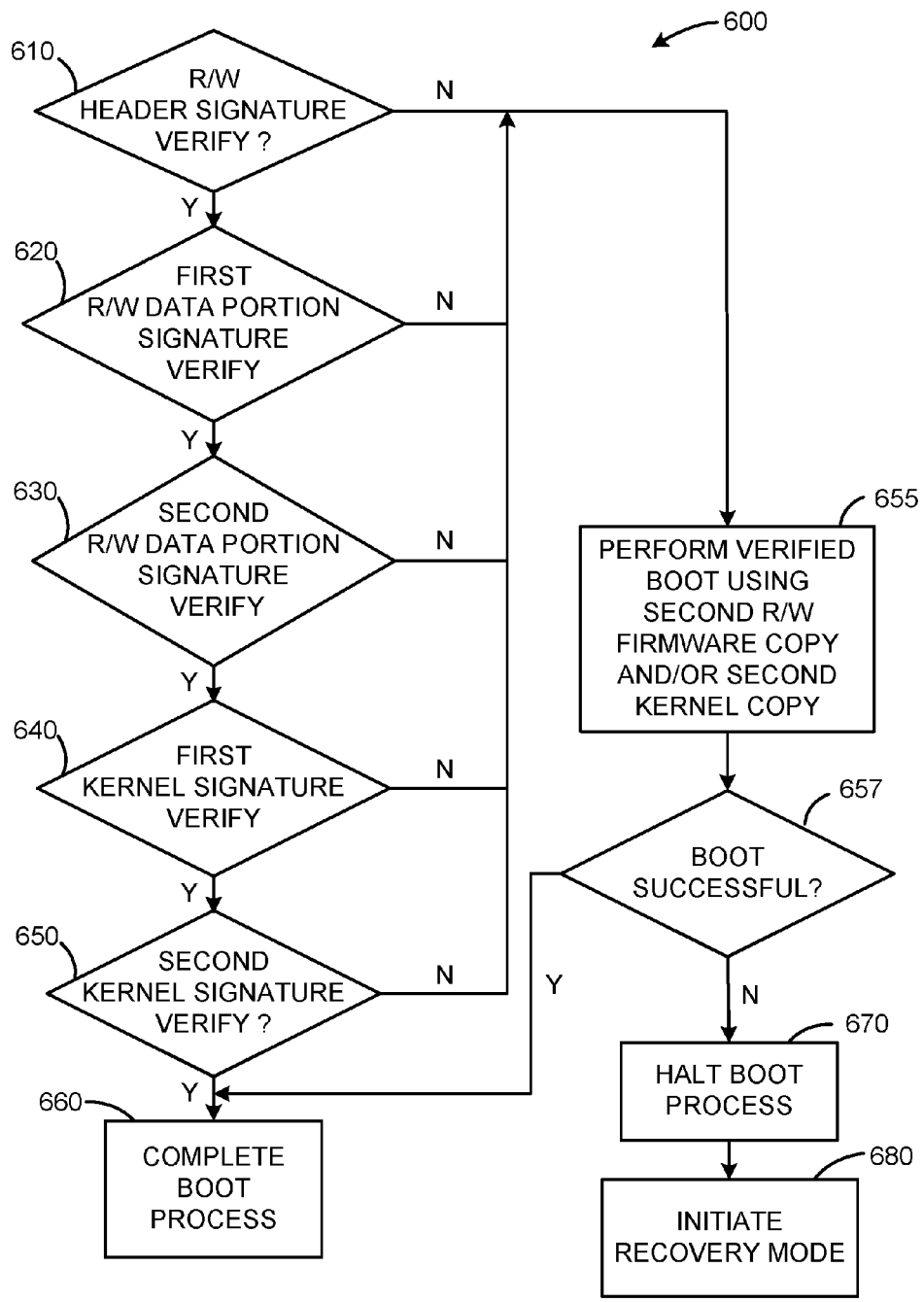
FIG. 6 is a flowchart illustrating a verified boot process in accordance with an example embodiment.

FIG. 6 is a flowchart illustrating a method 600 for implementing a verified boot process in accordance with an example embodiment. The method 600 implements a verified boot process by performing a series of encrypted signature verification operations at various points in a boot path. Those points may be the points of a boot path described herein, or may be other points in a boot path. The method 600 may be implemented using the signature verification techniques described herein. Signature generation and verification techniques other than those described herein may be employed. Further, the method 600 may be implemented in a number of appropriate computing system configurations.

The method 600 illustrates an example embodiment of a verified boot process for a computing system/device that is implemented with two (e.g., redundant) copies of R/W firmware and/or two (e.g., redundant) copies of a system kernel. In such an approach, if a signature verification operation fails on a first copy of the firmware and/or kernel, the verified boot process may continue by attempting to successfully boot using the second copy, or copies. In other embodiments, additional copies of R/W firmware and/or an operating system kernel may be implemented and used in a similar fashion as the second copies, as described herein.

In still other embodiments, only a single copy of R/W firmware and/or a system kernel may be available. In such approaches, the method 600 may eliminate operations related to the second copy or copies (i.e., blocks 655 and 657). In such approaches, if the verified boot process fails (e.g., a signature verification fails in any of blocks 610-650), the method 600 may proceed directly to block 670, where the verified boot process is halted and a recovery mode for the computing device is initiated, such as at block 680.

The method 600 includes, at block 610, verifying an encrypted signature corresponding with a first portion of a R/W portion of firmware of a computing system. The verification at block 610 may be accomplished using, for example, a first public-key and a first cryptographic hash algorithm. The verification may be performed using the approaches described above. For example, the first cryptographic hash may be used to generate a cryptographic hash value from the first portion of the read-write portion of the firmware. The first public-key may be used to decrypt the encrypted signature corresponding with the first portion of the R/W portion of the firmware. The generated cryptographic hash value may be compared to the decrypted signature and, if the values match, the boot process may continue to block 620.

In the method 600, if encrypted signature verification fails at any of the verification operations (e.g., in blocks 610-650), the method 600 moves to block 655, where the computing system attempts to perform the verified boot process using a second copy of the R/W firmware and/or a second copy of the kernel. In such a situation, the verified boot process at block 655 may continue from the point of failure encountered using the first copy or R/W firmware or system kernel. In other embodiments, the verified boot process at block 655 may start from the beginning of the process (e.g., by verifying a R/W firmware header, such as at block 610). In still other embodiments, the verified boot process may use the second copy of R/W firmware and/or system kernel in other appropriate fashion, such as only to verify a portion of the R/W firmware or system kernel for which signature verification failed on the first copy. In the method 600, the individual signature verification operations of the verified boot process at block 655 may be implemented in substantially the same manner as described herein with respect to the first copies of the R/W firmware and the kernel.

If it is determined, at block 657, that the verified boot process at block 655 is successful, the method 600 moves to block 660, and the verified boot process is continued. In such a situation, continuing the verified boot process at block 660 may include replacing the first copy of the R/W firmware and or kernel, for which a signature verification failed, with the second copy or copies.

However, if it is determined, at block 657, that the verified boot process has failed at block 655, the method 600 moves to block 670, where the verified boot process is halted. The method 600 then moves to block 680, where a computing system in which the verified boot process of the method 600 is implemented initiates recovery mode to restore its R/W firmware, and/or its operating system kernel, to a known state, such as discussed above. For purposes of brevity, this portion of the method 600 will not be described in detail with reference to each verification operation of the example verified boot process.

At block 620, the method 600 includes verifying an encrypted signature corresponding with a second portion of the read-write portion of the firmware. The verification at block 620 may be accomplished using, for example, a second public-key and a second cryptographic hash algorithm. The second public-key and the second cryptographic hash algorithm may be provided/indicated in the first portion of the R/W portion of the firmware, which may be a R/W firmware header, such as the header 300 discussed above with respect to FIG. 3. If the verification at block 620 is successful, the method 600 continues to block 630. If verification is not successful, the method 600 continues to block 655.

At block 630, the method 600 includes verifying an encrypted signature corresponding with a third portion of the read-write portion of the firmware. The verification at block 630 may be accomplished using, for example, the second public-key and the second cryptographic hash algorithm. If the verification at block 630 is successful, the method 600 continues to block 640. If verification is not successful, the method 600 continues to block 655.

At block 640, the method 600 includes verifying an encrypted signature corresponding with a first portion of an operating-system kernel. The verification at block 640 may be accomplished using, for example, the second public-key and the second cryptographic hash algorithm. If the verification at block 640 is successful, the method 600 continues to block 650. If verification is not successful, the method 600 continues to block 655.

At block 650, the method 600 includes verifying an encrypted signature corresponding with a second portion of the operating-system kernel. The verification at block 650 may be accomplished using, for example, a third public-key and a third cryptographic hash algorithm. The third public-key and the third cryptographic hash algorithm may be provided or indicated in the first portion of the operating-system kernel, which may be included in kernel information, such at the kernel information 510, as discussed above with respect to FIGS. 5A and 5B. If the verification at block 650 is successful, the method 600 continues to block 660. If verification is not successful, the method 600 continues to block 655. At block 660, the boot process is completed and control of a computing system implementing the verified boot process of the method 600 is transferred to, for example, an operating system.

In an example embodiment of the method 600, as described above, the encrypted signature corresponding with the first portion of the read-write portion of the firmware may be generated using the first cryptographic hash algorithm and a private-key corresponding with the first public-key. Also, in this example, the encrypted signatures corresponding with the second and third portions of the read-write portion of the firmware and the encrypted signature corresponding with the first portion of the operating system kernel may be generated using the second cryptographic hash algorithm and a private-key corresponding with the second public-key. Further in this example, the encrypted signature corresponding with the second portion of the operating-system kernel may be generated using the third cryptographic hash algorithm and a private-key corresponding with the third public-key.

As was discussed above, the strength of the cryptographic hash algorithms and the encryption/decryption algorithms used to implement a verified boot process using the techniques described herein, may vary. For instance, a verified boot process may start with very strong algorithms and then use weaker algorithms for later verification operations in order to improve the overall boot time of an associated computing system.

As an example, in the method 600 as described above, the second cryptographic algorithm and the third cryptographic algorithm may be the same algorithm, such as SHA-1, while the first cryptographic algorithm may be SHA-512. Alternatively, the second cryptographic algorithm may be SHA-256.

Like wise, when implementing the method 600 in the fashion described above, stronger encryption/decryption algorithms may be used for generating and verifying encrypted signatures. For example, in the method 600 as described above, the first public-key may be larger than the second public-key and the third public-key. In one example, the first public-key may be a RSA-4096 key, the second public-key may be a RSA-2048 key and the third public-key may be a RSA-1024 key. In other embodiments, the second public-key and the third public-key may have the same size/strength. In still other embodiments, additional elements of a computing system may be verified in similar fashions as discussed herein. For instance, once control of a computing system is passed to a kernel, the kernel may include instructions that are used to verify a file system, data, objects, applications and/or other elements of the computing system using similar techniques to those described herein.

FIGS. 7-11 are flowcharts that illustrate example methods of signature verification operations that may be implemented as the operations of blocks, 610-650, respectively. In the methods illustrated in FIGS. 7-11, failure of a signature verification operation results in a verified boot process being halted and a recovery mode being initiated. In other embodiments, the verified boot process could be continued on a second copy of R/W firmware or operating system kernel, such as discussed above with respect to FIG. 6. In such approaches, if signature verification fails on the second copy (or on all copies, for embodiments that implement more than two copies), then the boot process may be halted and recovery mode may be initiated.

Figure 7:
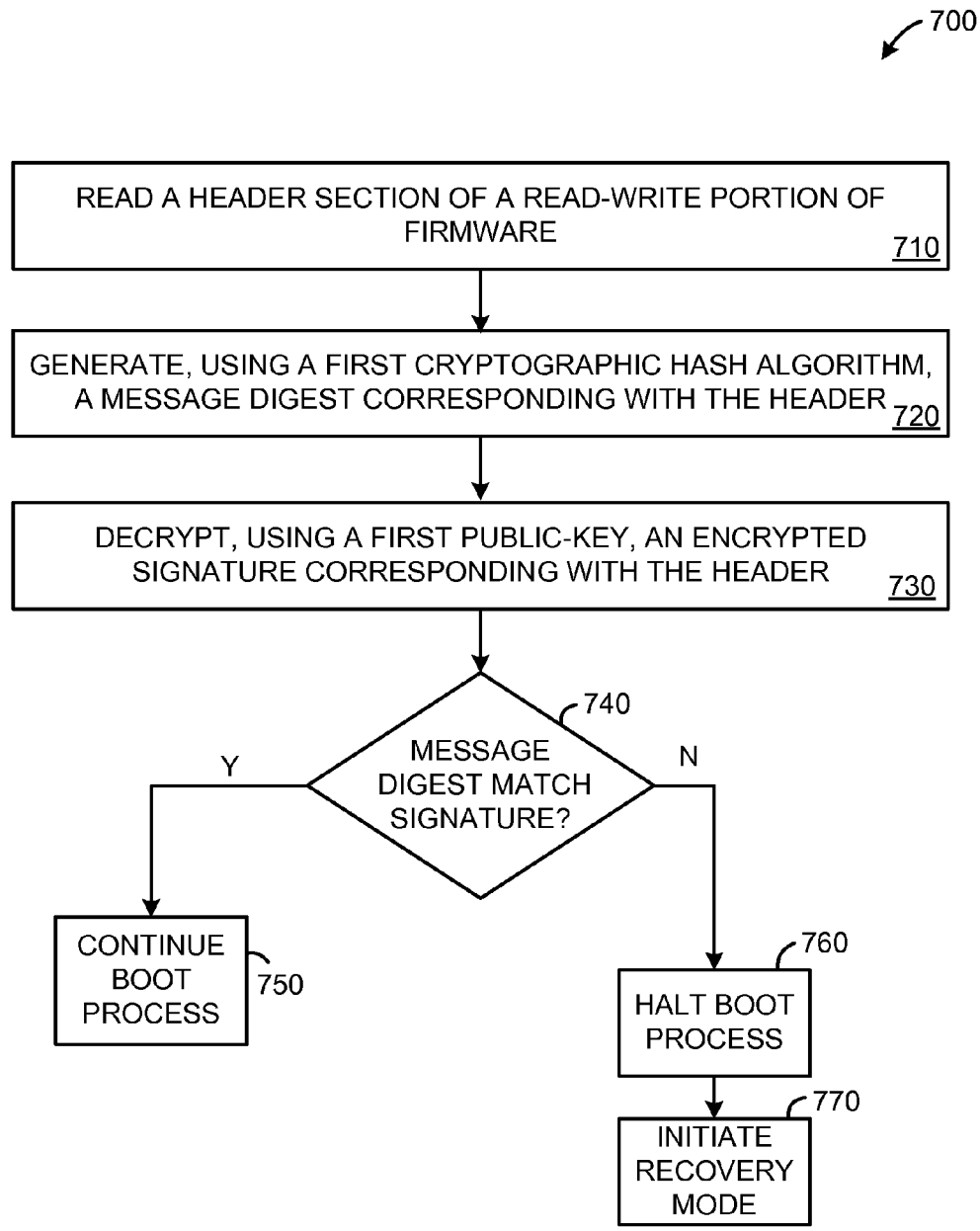
FIG. 7 is a flowchart illustrating a method of verifying a header portion of read-write firmware in accordance with an example embodiment.

FIG. 7 is a flowchart illustrating a method 700 of verifying a header portion of read-write firmware in accordance with an example embodiment, such as verifying the header 300 illustrated in FIG. 3. The method 700 will be described with further reference to FIG. 2 and FIG. 3. These references are for purposes of illustration. It will be appreciated that techniques other than those illustrated in FIGS. 2 and 3 may be used to implement the method 700.

In this example, (with reference to firmware 200 and header 216/300), the method 700 includes, at block 710, reading a header section 216/300 of a read-write portion 212 of firmware 200. The method 700 further includes, at block 720, generating, using a first cryptographic hash algorithm, a message digest corresponding with the header 216/300. At block 730, the method 700 includes decrypting, using a first public-key 208, an encrypted signature 218 corresponding with the header 216/300. At block 740, the method 700 includes comparing the message digest corresponding with the header and the decrypted signature corresponding with the header. If the message digest and the decrypted signature match at block 740, the method continues at block 750 and the verified boot process continues. If the message digest and the decrypted signature do not match at block 740, the method continues at block 760 and the verified boot process is halted. At block 770 of the method 700, a recovery mode is initiated for a computing system implementing the method 700.

Figure 8:
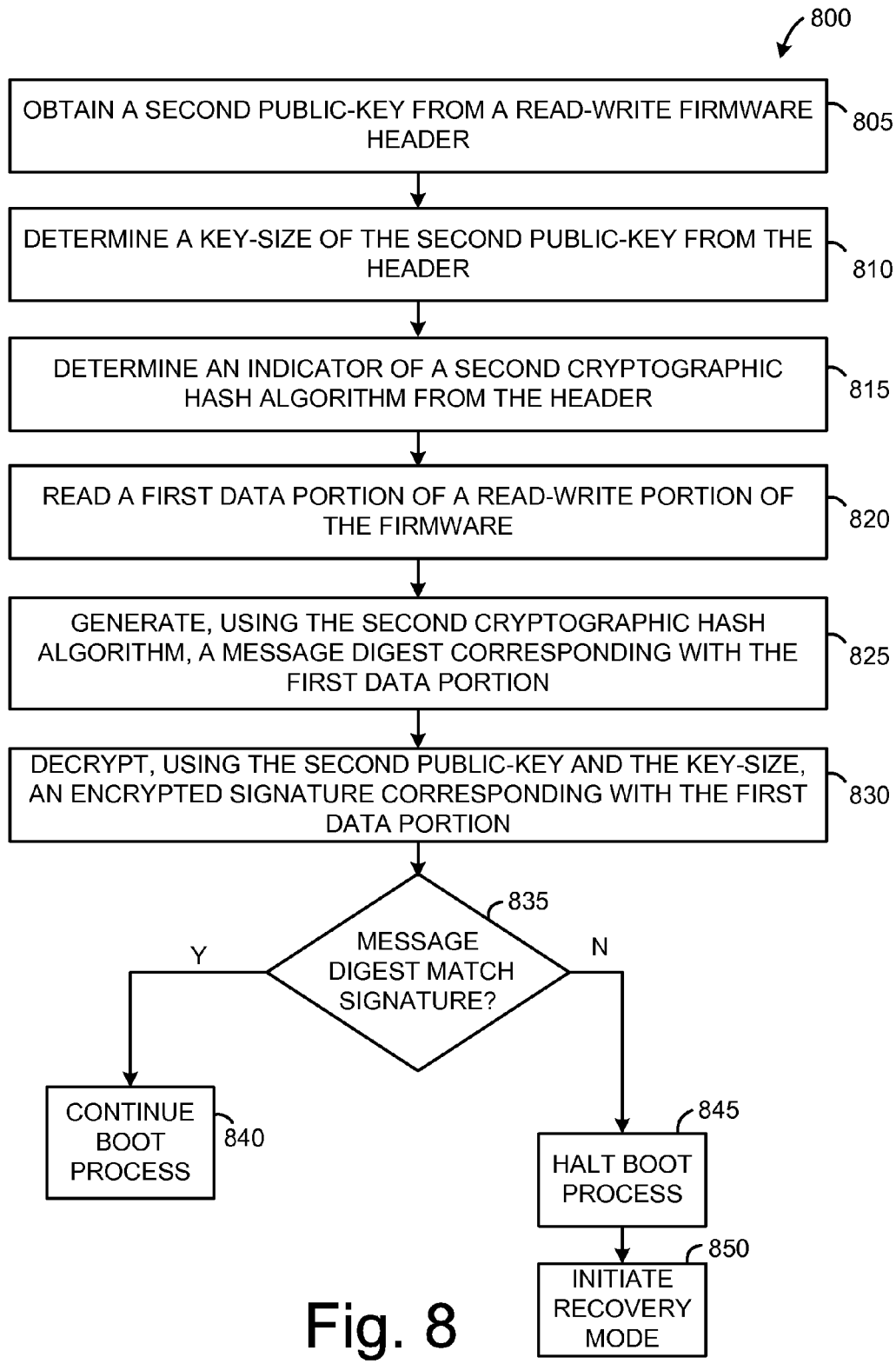
FIG. 8 is a flowchart illustrating a method of verifying a first data portion of read-write firmware in accordance with an example embodiment.

FIG. 8 is a flowchart illustrating a method of verifying a first data portion of read-write firmware in accordance with an example embodiment, such as verifying the R/W firmware information 222, as illustrated in FIG. 2. The method 800 will also be described with further reference to FIG. 2 and FIG. 3. In an example embodiment, the method 800 may be implemented as block 750 of the method 700. Of course, other approaches are possible.

At block 805, the method 800 includes obtaining a second public-key 350 from the header 216/300. At block 810, the method 800 includes determining a key-size 330 of the second public-key 350 from the header 216/300. At block 815, the method 800 includes determining an indicator 340 of a second cryptographic hash algorithm from the header 216/300.

The method 800 includes, at block 820, reading a first data portion (e.g., the R/W firmware information 222) of a read-write data portion 220 of the firmware 200. The method 800 further includes, at block 825, generating, using the second cryptographic hash algorithm, a message digest corresponding with the R/W firmware information 222. At block 830, the method 800 includes decrypting, using the second public-key 350, an encrypted signature 224 corresponding with the R/W firmware information 222. At block 835, the method 800 includes comparing the message digest corresponding with the R/W firmware information and the decrypted signature corresponding with the R/W firmware information. If the message digest and the decrypted signature match at block 835, the method continues at block 840 and the verified boot process continues. If the message digest and the decrypted signature do not match at block 835, the method continues at block 845 and the verified boot process is halted. At block 850 of the method 800, a recovery mode (such as previously described) is initiated for a computing system implementing the method 800.

Figure 9:
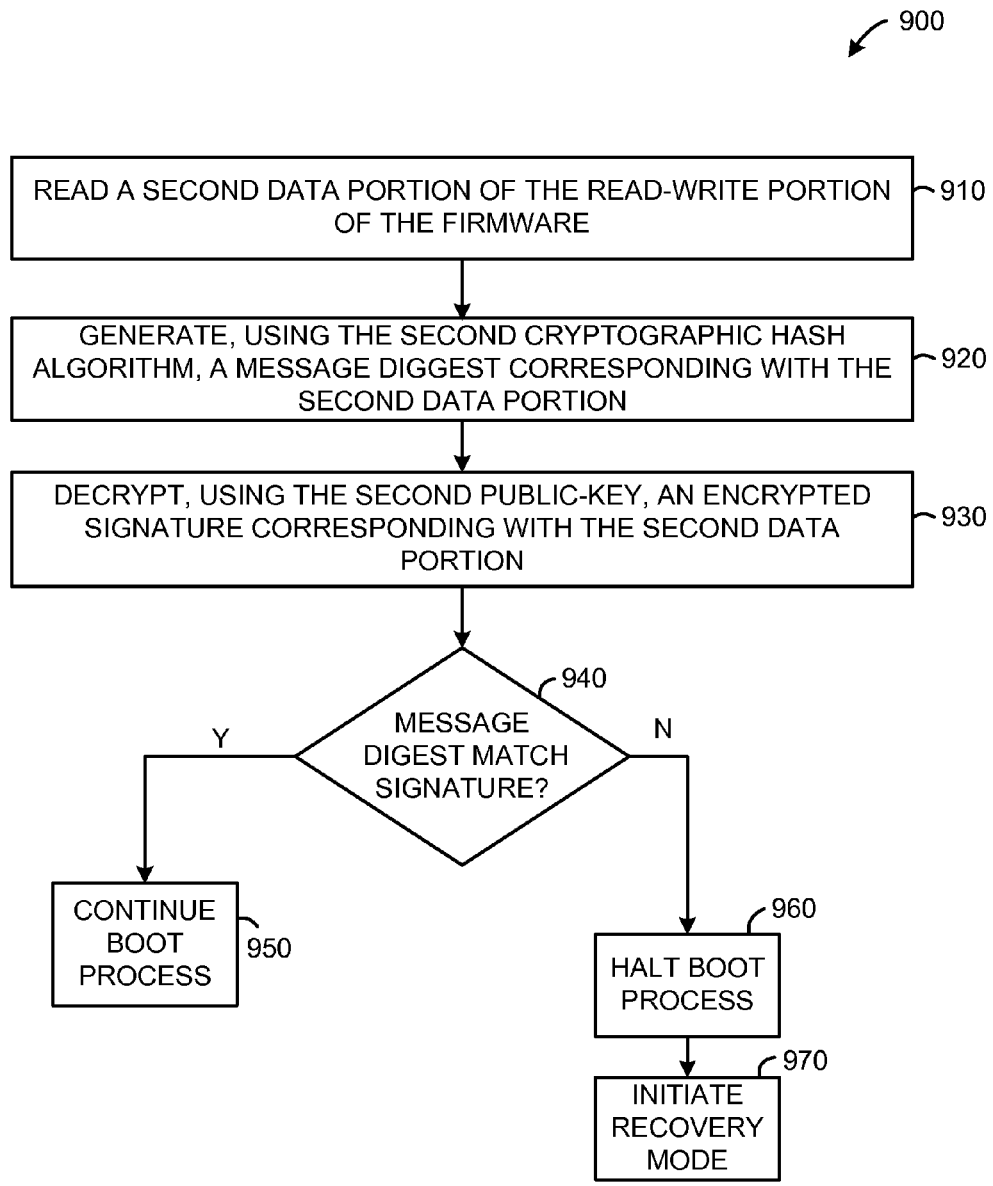
FIG. 9 is a flowchart illustrating a method of verifying a second data portion of read-write firmware in accordance with an example embodiment.

FIG. 9 is a flowchart illustrating a method 900 of verifying a second data portion of read-write firmware in accordance with an example embodiment, such as verifying the R/W firmware data 226 illustrated in FIG. 2. The method 900 will also be described with further reference to FIG. 2 and FIG. 3. In an example embodiment, the method 900 may be implemented as block 840 of the method 800. Of course, other approaches are possible.

In this example, the method 900 includes, at block 910, reading a second data portion (e.g., the R/W firmware data 226) of the R/W portion 212 of the firmware 200. The method 900 further includes, at block 920, generating, using the second cryptographic hash algorithm, a message digest corresponding with the R/W firmware data 226. At block 930, the method 900 includes decrypting, using the second public-key 350, an encrypted signature 230 corresponding with the R/W firmware data 226. At block 940, the method 900 includes comparing the message digest corresponding with the R/W firmware data and the decrypted signature corresponding with the R/W firmware data. If the message digest and the decrypted signature match at block 940, the method continues at block 950 and the verified boot process continues. If the message digest and the decrypted signature do not match at block 940, the method continues at block 960 and the verified boot process is halted. At block 970 of the method 900, a recovery mode is initiated for a computing system implementing the method 900.

Figure 10:
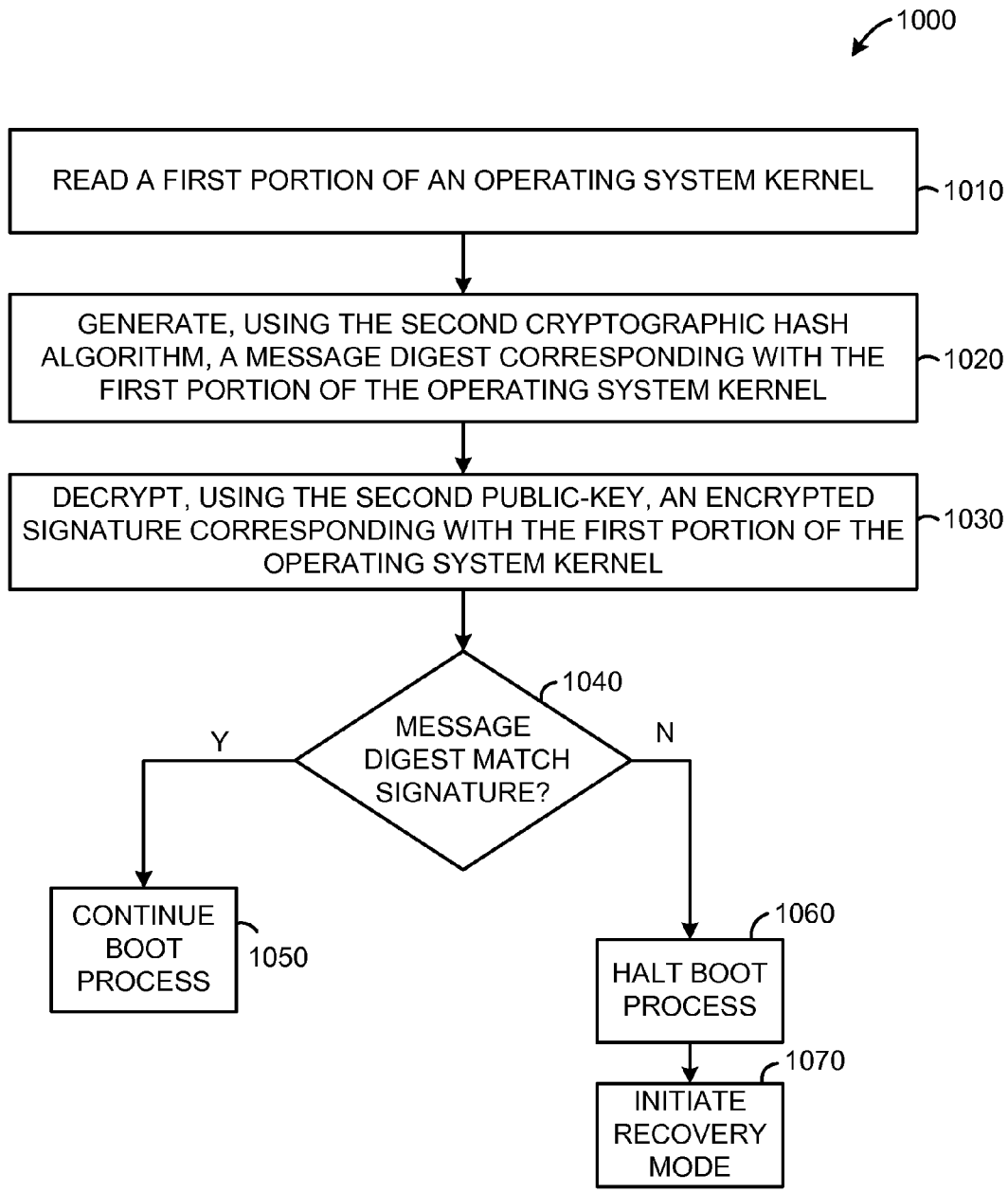
FIG. 10 is a flowchart illustrating a method of verifying a first portion of an operating system kernel in accordance with an example embodiment.

FIG. 10 is a flowchart illustrating a method 1000 of verifying a first portion of an operating system kernel in accordance with an example embodiment, such as verifying the kernel information 510 illustrated in FIGS. 5A and 5B. The method 1000 will be described with further reference to FIGS. 5A and 5B. In an example embodiment, the method 1000 may be implemented as block 950 of the method 900. Of course, other approaches are possible.

In this example, the method 1000 includes, at block 1010, reading a first portion (e.g., the kernel information 510) of an operating system kernel 500. The method 1000 further includes, at block 1020, generating, using the second cryptographic hash algorithm, a message digest corresponding with the kernel information 510. At block 1030, the method 1000 includes decrypting, using the second public-key 350, an encrypted signature 520 corresponding with the kernel information 510. At block 1040, the method 1000 includes comparing the message digest corresponding with the kernel information and the decrypted signature corresponding with the kernel information. If the message digest and the decrypted signature match at block 1040, the method continues at block 1050 and the verified boot process continues. If the message digest and the decrypted signature do not match at block 1040, the method continues at block 1060 and the verified boot process is halted. At block 1070 of the method 1000, a recovery mode is initiated for a computing system implementing the method 1000.

Figure 11:
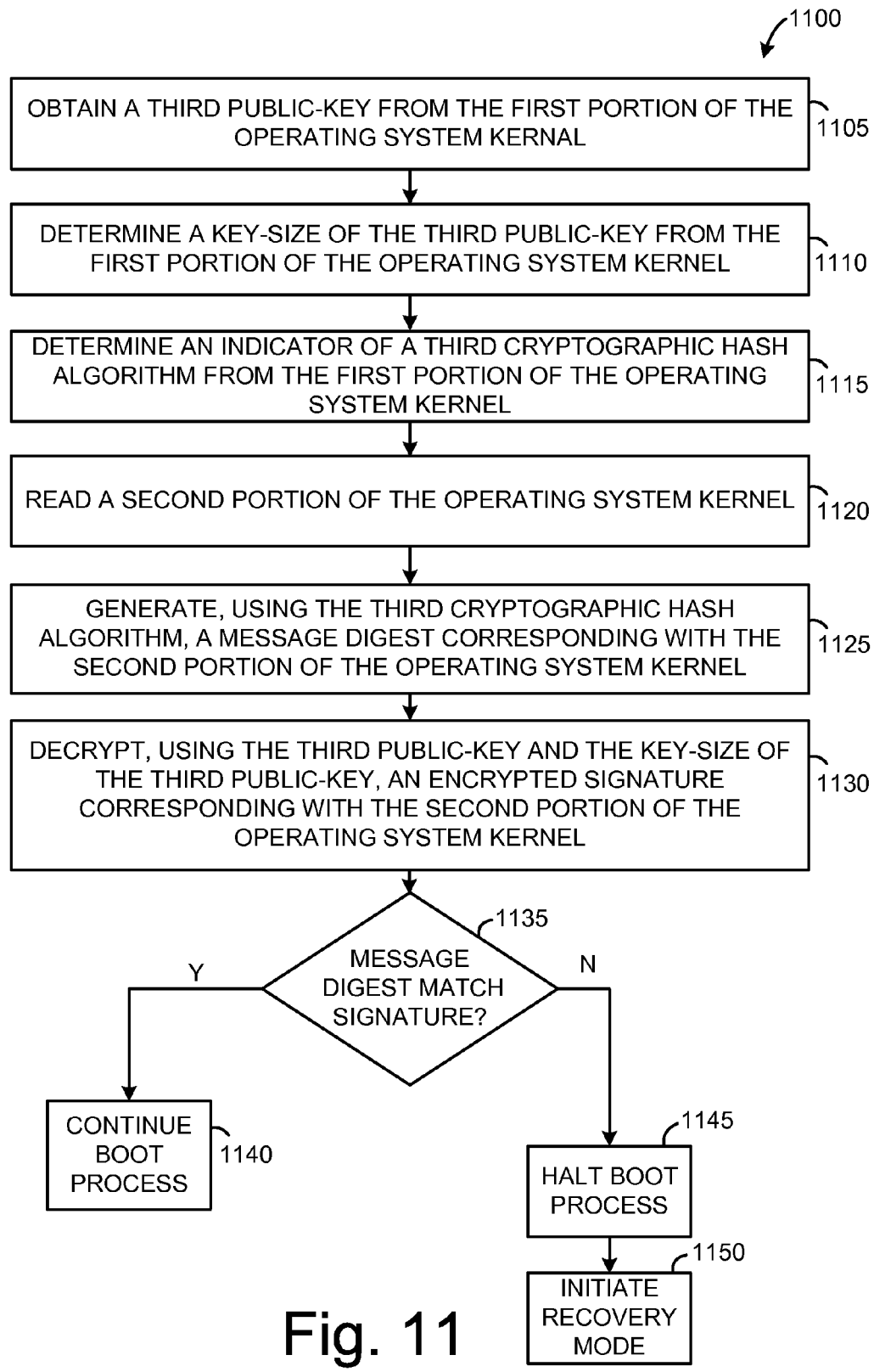
FIG. 11 is a flowchart illustrating a method of verifying a second portion of an operating system kernel in accordance with an example embodiment.

FIG. 11 is a flowchart illustrating a method 1100 of verifying a second portion of an operating system kernel in accordance with an example embodiment, such as verifying the kernel instructions 530, as illustrated in FIG. 5A. The method 1100 will be described with further reference to FIGS. 5A and 5B. In an example embodiment, the method 1100 may be implemented as block 1050 of the method 1000. Of course, other approaches are possible.

At block 1105, the method 1100 includes obtaining a third public-key 570 from the kernel information 510. At block 1110, the method 1100 includes determining a key-size 560 of the third public-key 570 from the kernel information 510. At block 1115, the method 1100 includes determining an indicator 565 of a third cryptographic hash algorithm from the kernel information 510.

The method 1100 still further includes, at block 1120, reading a second portion of the kernel 500, such as the kernel instructions 530. The method 1100 further includes, at block 1125, generating, using the third cryptographic hash algorithm, a message digest corresponding with the kernel instructions 530. At block 1130, the method 1100 includes decrypting, using the third public-key 570, an encrypted signature 540 corresponding with the kernel instructions 530. At block 1135, the method 1100 includes comparing the message digest corresponding with the kernel instructions and the decrypted signature corresponding with the kernel instructions. If the message digest and the decrypted signature match at block 1135, the method continues at block 1140 and the verified boot process continues. If the message digest and the decrypted signature do not match at block 1135, the method continues at block 1145 and the verified boot process is halted. At block 1150 of the method 1100, a recovery mode (such as previously described) is initiated for a computing system implementing the method 1100.

Figure 12A:
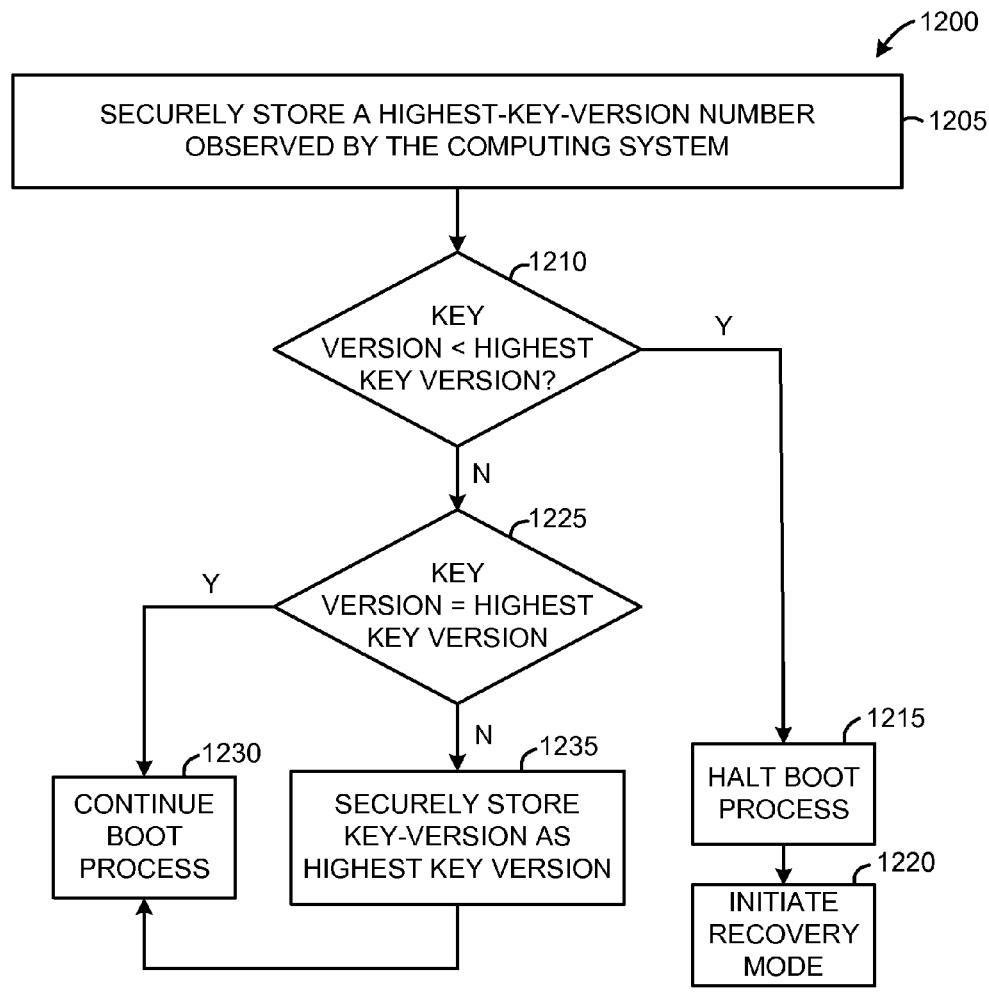
FIGS. 12A and 12B are flowcharts illustrating a method of verifying and maintaining key version numbers in accordance with an example embodiment.
Figure 12B:
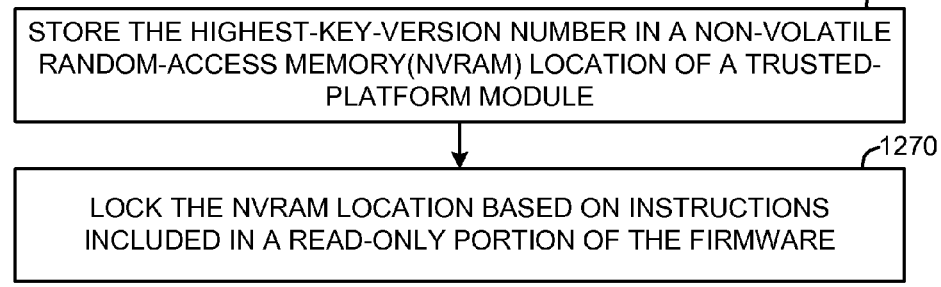

FIGS. 12A and 12B are flowcharts illustrating a method of verifying and maintaining key version numbers in accordance with an example embodiment. FIG. 12A is a flowchart illustrating a method 1200 for verifying and/or updating a key version number. The method 1200 includes, at block 1205, securely storing a highest-key-version number (e.g., for verifying R/W firmware and/or a kernel) observed by a computing system, such as in an NVRAM location in a TPM, as previously described. At block 1210, the method 1200 includes comparing a key-version number included in R/W firmware and/or a kernel being used to boot a computing system with the corresponding securely stored highest-key-version number. In the event the key-version number is less than the highest key-version number, the method 1200 includes, at block 1215, halting the boot process and, at block 1220, initiating a recovery mode for the computing system.

In the event the key-version number is equal to the highest key-version number at block 1225, the method 1200 includes, at block 1240, continuing the boot process. In the event that the key-version number is not equal to the highest key-version number (i.e., is greater than the highest key-version number) at block 1225, the method 1200 includes, at block 1235, securely storing the key-version number as the highest key-version number, such as in an NVRAM location in a TPM, as previously discussed. In certain embodiments, the key-version number may be updated only after the boot process is successfully completed. In embodiments that implement multiple copies of R/W firmware and/or a kernel, the key-version of a respective copy of the R/W firmware and/or kernel employed during the boot process would be compared with the securely stored highest key-version number in the method 1200.

FIG. 12B is a flowchart illustrating a method 1250 for securely storing a highest key version number. The method 1250 includes, at block 1260, storing the highest-key-version number in a non-volatile random-access memory (NVRAM) location of a trusted-platform module. The method 1250 further includes, at block 1270, locking the NVRAM location based on instructions included in a read-only portion of the firmware, such as by individually or globally locking NVRAM locations in a TPM, as was discussed above.

Figure 13A:
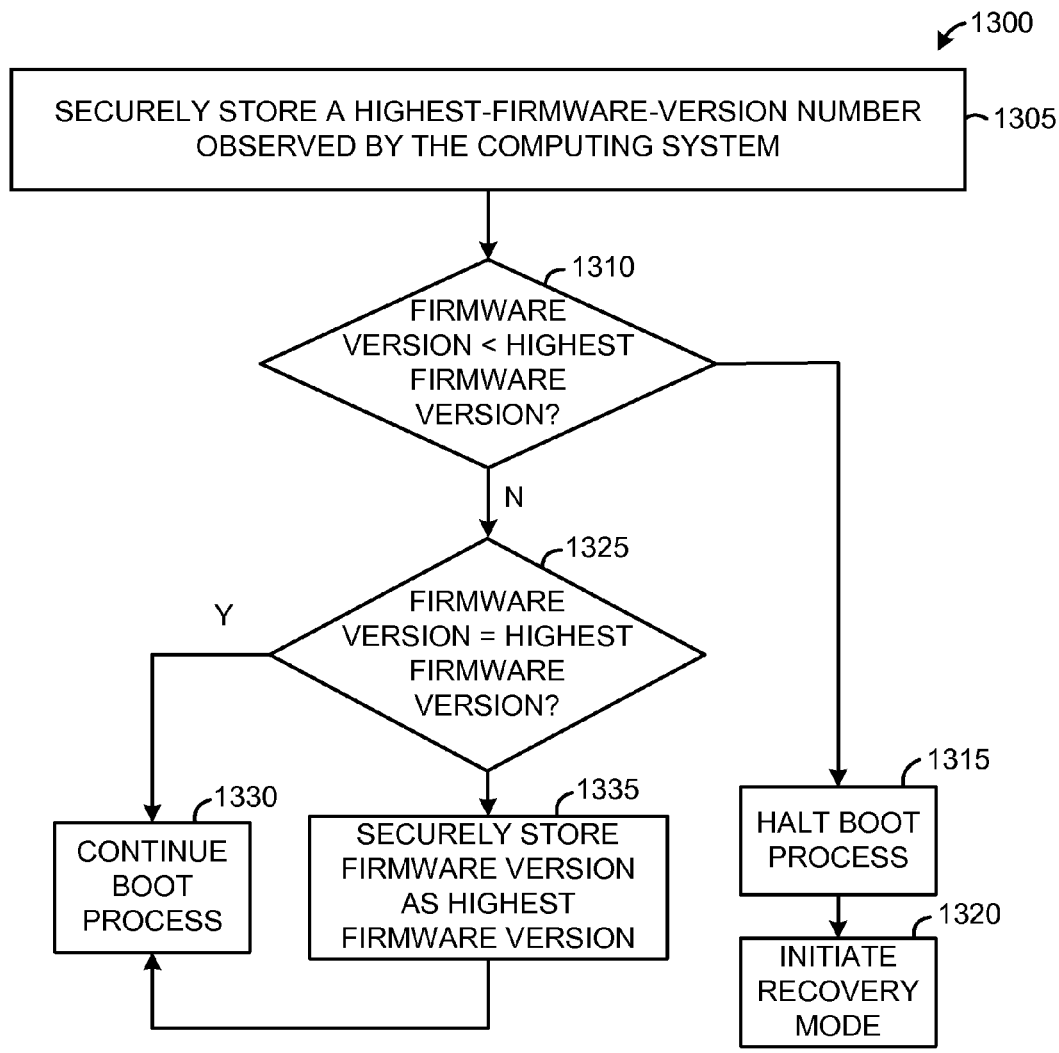
FIGS. 13A and 13B are flowcharts illustrating a method of verifying and maintaining firmware version numbers in accordance with an example embodiment.
Figure 13B:
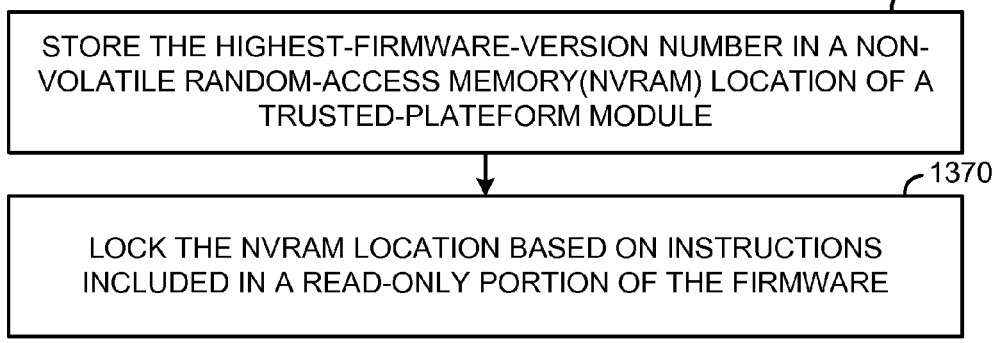

FIGS. 13A and 13B are flowcharts illustrating a method of verifying and maintaining firmware version numbers in accordance with an example embodiment. FIG. 13A is a flowchart illustrating a method 1300 for verifying and/or updating a firmware version number. The method 1300 includes, at block 1305, securely storing a highest-firmware-version number observed by the computing system, such as in an NVRAM location in a TPM, as was discussed above. The method 1300 further includes, at block 1310, comparing the firmware-version number with the securely stored highest-firmware-version number. In the event the firmware-version number is less than the highest-firmware-version number at block 1310, the method 1300 includes, at block 1315, halting the boot process and, at block 1320, initiating a recovery process to restore the read-write portion of the firmware to a trusted state. In the event the firmware-version number is equal to the highest-firmware-version number at block 1325, the method 1300 includes, at block 1330, continuing the boot process. In the event the firmware-version number is not equal to the highest-firmware-version number at block 1325 (i.e., is greater than the highest-firmware-version number) at block 1325, the method 1300 includes, at block 1335, securely storing the firmware-version number as the highest-firmware-version number, such as in an NVRAM location in a TPM, as previously described.

In certain embodiments, the firmware-version number may be updated only after the boot process is successfully completed. In embodiments that implement multiple copies of R/W firmware, the firmware-version number of a respective copy of the R/W firmware being employed during the boot process would be compared with the securely stored highest-firmware-version number in the method 1300.

FIG. 13B is a flowchart illustrating a method 1350 for securely storing a highest firmware-version number. The method 1350 includes, at block 1360, storing a highest firmware-version number observed by a computing system in a NVRAM location of a TPM, such as previously discussed. The method 1350 further includes, at block 1370, locking the NVRAM location based on instructions included in a read-only portion of the firmware, such as by individually or globally locking NVRAM locations in a TPM, as was discussed above.

Figure 14:
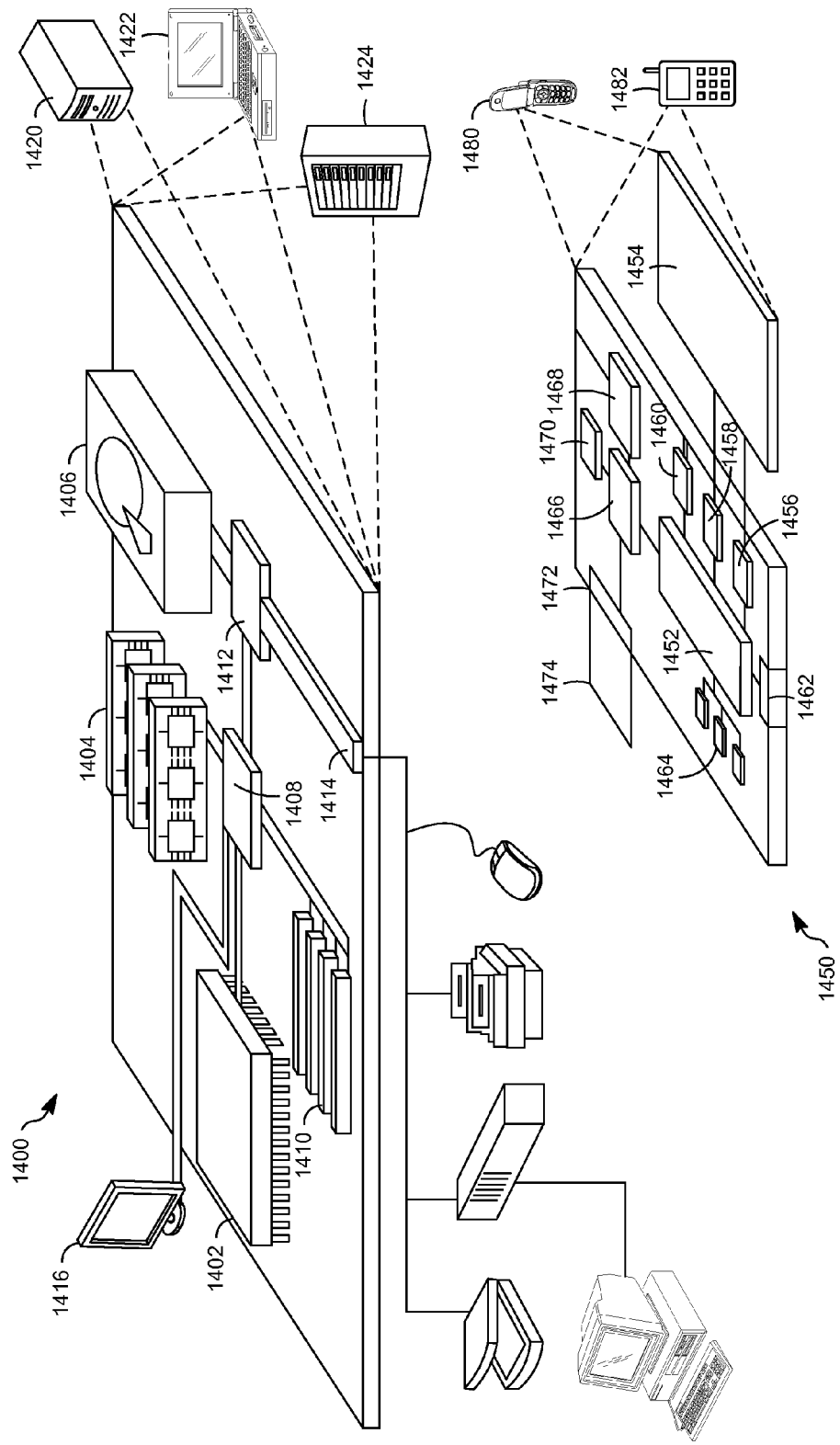
FIG. 14 shows an example of a computing device and a mobile computing device that can be used to implement the techniques described here.

FIG. 14 shows an example of a generic computer device 1400 and a generic mobile computer device 1450, which may be used with the techniques described here. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452, which may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, WiFi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smart phone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for executing a boot process on a computing device comprising:
    performing a first signature verification process on a header signature included in a first plurality of digital signatures included in a first portion of firmware included in the computing device;
    based on the first signature verification process determining that the header signature is valid, performing a second signature verification process on a first data portion signature included in the first plurality of digital signatures included in the first portion of firmware;
    based on the second signature verification process determining that the first data portion signature is valid, performing a third signature verification process on a second data portion signature included in the first plurality of digital signatures included in the first portion of firmware; and
    based on the third signature verification process determining that the second data portion signature is not valid, continuing the execution of the boot process comprising:
        performing a fourth signature verification process on a digital signature included in a second plurality of digital signatures included in a second portion of firmware;
        and
        based on the fourth signature verification process determining that the digital signature is valid, completing the execution of the boot process using the second portion of firmware included in the computing device.

2. The method of claim 1,
    wherein the first data portion signature is a first firmware information signature, and
    wherein the second data portion signature is a first read/write (R/W) firmware data signature.

3. The method of claim 2, wherein the second plurality of digital signatures included in the second portion of firmware includes a second header signature, a second firmware information signature, and a second read/write (R/W) firmware data signature.

4. The method of claim 1,
    wherein the first portion of firmware is read/write; and
    wherein the method further comprises, subsequent to completing the boot process using the second portion of firmware included in the computing device, executing a recovery mode process including replacing contents of the first portion of firmware with contents of the second portion of firmware.

5. The method of claim 4,
wherein the boot process is executed when the computing device is operating in a first mode, and
wherein the recovery mode process is executed when the computing device is operating in a second mode.

6. The method of claim 5, wherein the second mode is a secure user mode.

7. The method of claim 1,
wherein the first portion of firmware is read/write; and
wherein the method further comprises, based on determining that the digital signature is not valid:
halting the execution of the boot process;
obtaining, from a storage device operationally coupled to the computing device, an operating image stored on the storage device, the operating image including a third portion of firmware for use by the computing device;
performing a fifth signature verification process on another digital signature included in a third plurality of digital signatures included in the third portion of firmware;
determining that the other digital signature is valid; and
based on determining that the other digital signature is valid, executing a recovery mode process including replacing contents of the first portion of firmware with contents of the third portion of firmware.

8. The method of claim 7,
wherein the storage device is a removable storage device, and
wherein the storage device, when operationally coupled to another computing device and not operationally coupled to the computing device, obtains the operating image from a website maintained by a manufacturer of the computing device and stores the obtained operating image on the storage device.

9. The method of claim 1,
wherein the header signature is encrypted and associated with data included in a header section of the first portion of firmware;
wherein performing the first signature verification process on the header signature includes:
reading, by the computing device during the boot process, the data included in the header section of the first portion of firmware;
generating, using a cryptographic hash algorithm, a message digest corresponding with the data;
decrypting, using a public-key, the header signature; and
comparing the message digest corresponding with the data and the decrypted header signature; and
wherein determining that the header digital signature is valid includes determining that the message digest corresponding with the data and the decrypted first digital signature match.

10. The method of claim 9, wherein the reading, generating, decrypting and comparing are performed by the computing device using instructions stored in a read-only portion of firmware.

11. The method of claim 10, wherein the public-key is stored in the read-only portion of the firmware.

12. The method of claim 1,
wherein the digital signature is encrypted and associated with data included in a section of the second portion of firmware;
wherein performing the fourth signature verification process on the digital signature includes:
reading the data included in the section of the second portion of firmware;
generating, using a cryptographic hash algorithm, a message digest corresponding with the data;
decrypting, using a public-key, the digital signature; and
comparing the message digest corresponding with the data and the decrypted digital signature; and
wherein determining that the digital signature is valid includes determining that the message digest corresponding with the data and the decrypted digital signature match.

13. The method of claim 12, wherein the reading, generating, decrypting and comparing are performed by the computing device using instructions stored in a read-only portion of firmware.

14. The method of claim 13, wherein the public-key is stored in the read-only portion of the firmware.

15. A computing system comprising:
a first read/write portion of firmware including a first plurality of digital signatures including a first header signature, a first firmware information signature, and a first read/write (R/W) firmware data signature, each of the first plurality of digital signatures associated with a respective element included in a first plurality of elements included in the first read/write portion of firmware;
a second read/write portion of firmware including a second plurality of digital signatures including a second header signature, a second firmware information signature, and a second read/write (R/W) firmware data signature, each of the second plurality of digital signatures associated with a respective element included in a second plurality of elements included in the second read/write portion of firmware; and
a read-only portion of firmware including a public-key, at least one cryptographic hash algorithm, at least one decryption algorithm, and boot instructions for a verified boot process, the read-only portion of the firmware configured to execute the boot instructions, the executing comprising:
using the public-key, the at least one cryptographic hash algorithm, and the at least one decryption algorithm, determining whether each of the first plurality of digital signatures are valid;
based on determining that one of the first plurality of digital signatures is not valid, using the public-key, the at least one cryptographic hash algorithm, and the at least one decryption algorithm, determining whether each of the second plurality of digital signatures are valid; and
based on determining that each of the second plurality of digital signatures is valid, completing the execution of the boot process using the second read/write portion of firmware.

16. The system of claim 15, wherein the second read/write portion of firmware is a copy of the first read/write portion of firmware.

17. The system of claim 15,
further comprising a storage device configured to store an operating image including a third read/write portion of firmware including a third plurality of digital signatures, each of the third plurality of digital signatures associated with a respective element included in a third plurality of elements included in the third read/write portion of firmware; and wherein the read-only portion of the firmware is further configured to execute the boot instructions using the public-key, the at least one cryptographic hash algorithm, and the at least one decryption algorithm to determine whether each of the third plurality of digit signatures are valid.

18. The system of claim 17, the third read/write portion of firmware is a copy of the first read/write portion of firmware.

19. A computing system comprising one or more non-transitory machine readable storage media having instructions stored thereon, the instructions, when executed by a processor of the computing system, cause the computing system to execute a boot process on a computing device, the executing comprising:

performing a first signature verification process on a header signature included in a first plurality of digital signatures included in a first portion of firmware included in the computing device;

based on the first signature verification process determining that the header signature is valid, performing a second signature verification process on a first data portion signature included in the first plurality of digital signatures included in the first portion of firmware;

based on the second signature verification process determining that the first data portion signature is valid, performing a third signature verification process on a second data portion signature included in the first plurality of digital signatures included in the first portion of firmware; and based on the third signature verification process determining that the second data portion signature is not valid, continuing the execution of the boot process comprising:

performing a fourth signature verification process on a digital signature included in a second plurality of digital signatures included in a second portion of firmware;

and based on the fourth signature verification process determining that the digital signature is valid, completing the execution of the boot process using the second portion of firmware included in the computing device.

* * * * *